United States Patent [19]

Dumont

[11] Patent Number: 4,490,202

[45] Date of Patent: Dec. 25, 1984

[54] DEVICE AND METHOD OF POSITIONING OPTICAL FIBERS

[75] Inventor: Francois Dumont, Soisy-sur-Seine, France

[73] Assignee: U.S. Philips Corporation, New York, N.Y.

[21] Appl. No.: 480,198

[22] Filed: Mar. 30, 1983

[30] Foreign Application Priority Data

Apr. 7, 1982 [FR] France ................. 82 06078

[51] Int. Cl.³ .................... B23Q 3/18; B32B 5/02
[52] U.S. Cl. .................... 156/166; 29/281.5; 156/273.9; 156/297; 156/298; 156/306.6; 156/433; 156/567; 269/60; 269/903
[58] Field of Search ............. 156/158, 159, 178, 179, 156/293, 303.1, 304.2, 297, 298, 502, 552, 433, 436, 219, 580, 556, 562; 350/96.15, 96.27, 96.24; 356/73.1, 399, 400, 401, 147; 269/60, 909, 903, 1.5, 293.25; 29/271, 281.5, 281.4

[56] References Cited

U.S. PATENT DOCUMENTS

| | | | |
|---|---|---|---|
| 3,783,065 | 1/1974 | Stone | 156/158 |
| 4,028,162 | 6/1977 | Cherin et al. | 156/158 |
| 4,079,927 | 3/1978 | Rocton | 269/903 |
| 4,227,951 | 10/1980 | Mishien | 156/158 |

FOREIGN PATENT DOCUMENTS 2411424  7/1979  France.

*Primary Examiner*—Michael Ball
*Attorney, Agent, or Firm*—Marc D. Schechter

[57] ABSTRACT

A device for accurately positioning wire-shaped articles. The device includes positioning means comprising two groups of pins which are parallel to each other and which are provided with grooves. The articles to be positioned are disposed in the grooves. Fixing means and elastic means are provided to keep the articles in tension in the grooves. Translation means comprise a movable block on which the articles are placed, one at a time during the positioning. Optical means are provided for accurately measuring the positions of the articles.

Several methods of positioning optical fibers by means of this device yield a rigid assembly in which the optical fibers are immovably enclosed between two rigid blocks by an adhesive, by pressure or by any other means.

10 Claims, 8 Drawing Figures

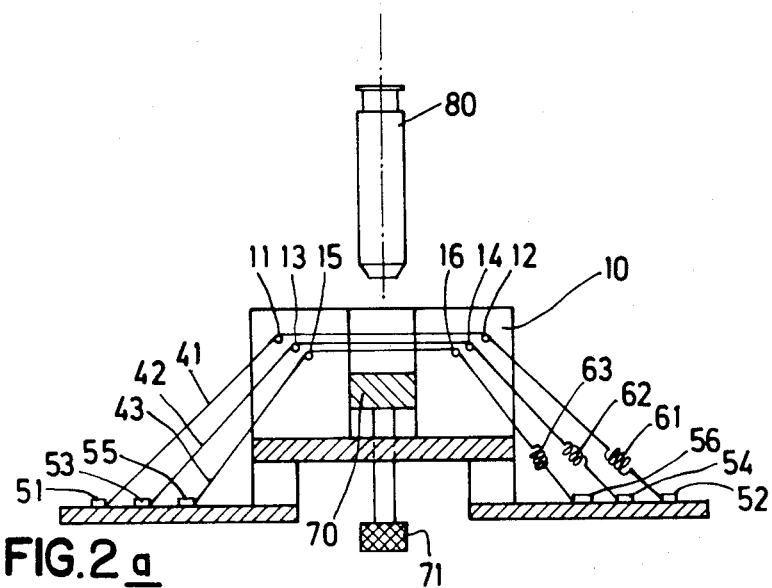
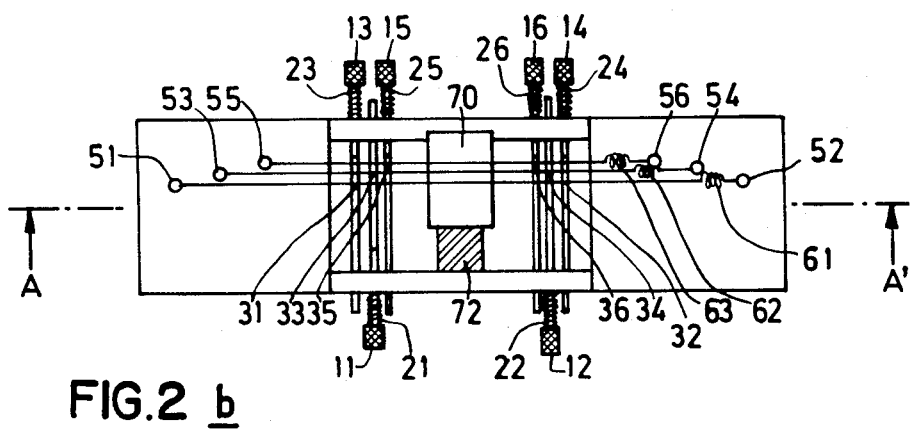

DEVICE AND METHOD OF POSITIONING OPTICAL FIBERS

BACKGROUND OF THE INVENTION

The invention relates to a device for positioning several wire-shaped articles with respect to each other and to methods of positioning several optical fibers by means of this device.

In the use of optical fibers, it is often necessary to position several fibers with respect to each other with a high degree of accuracy. This is the case, for example, in certain wavelength multiplexers/demultiplexers.

Wavelength multiplexing is a technique in which several luminous signals of different wavelengths are caused to travel in the same optical fibers. These signals are each modulated independently of each other so that the transmission capacity of the fiber is increased. When this technique is used, it is necessary to utilize devices (multiplexers) which inject the light emitted by several transmitters (having different wavelengths) into the same optical fiber. It is also necessary to utilize devices (demultiplexers) which separate the different wavelengths of light emitted from the fiber The essential part of these multiplexer/demultiplexer devices is a wavelength dispersive element: a prism, a network, a non-achromatic lens.

In the demultiplexer mode of operation, the light beam emitted by the end of the emitting fiber is collimated by a collimator lens. The collimated beam is then dispersed by the dispersive element. At the output of the dispersive element several distinct emerging beams are obtained which are passed to a decollimator lens. Several monochromatic or quasi monochromatic images of the end of the emitting fiber are produced in the focal plane of the decollimator lens.

The receiving fibers are arranged so that the end of each of them coincides with one of the monochromatic images. Thus, the signals separated according to their wavelength are collected in the receiving fibers. With the same device, the multiplexer mode of operation can be realized if the direction of propagation of the light in each of the fibers is reversed.

Irrespective of the chosen mode of operation, it is necessary to arrange the ends of each of the receiving fibers so as to coincide with the position of each of the monochromatic images of the emitting fiber. Each fiber has to be positioned with a high degree of accuracy. For example, in the case of a fiber whose core diameter is 50 μm, the positioning has to be ensured with an accuracy of a few microns.

Among the known devices for positioning and connecting optical fibers is the device described in French Pat. No. 2,411,424. This device uses the usual technique of etching diffraction networks, and it ensures an accurate positioning of the fibers with respect to each other. In this device, a matrix is formed by deposition of a thin metal layer on a support polished to be optically flat. Parallel slots for receiving the are then cut into the metal layer by means of a diamond machine tool provided with interferometer control systems. The cost of such a matrix is of course extraordinarily high.

SUMMARY OF THE INVENTION

It is an object of the invention to provide a device of simple construction, of small volume and of low cost for positioning optical fibers with respect to each other with a high degree of accuracy.

The device according to the invention comprises positioning means, fixing means, translation means and optical means.

The positioning means includes two groups of pins which are mounted on a support. The pins are parallel to each other and are grouped in pairs according to several levels slightly offset with respect to each other. Each pin has a nonthreaded part provided with a groove and a threaded part. These parts pass through nonthreaded holes, respectively, formed opposite each other in the support. Each wire-shaped article to be positioned bears in the grooves of a pair of pins so that rotation of the pins leads to a displacement of the wire-shaped article supported thereby.

The fixing means includes means for fixing the ends of the wire-shaped articles on the support. This is accomplished with elastic means for pressing each wire-shaped article to bear in the grooves with a small amount of tension.

The translation means includes means ensuring the translation of a movable block between the pins of each pair of pins in a direction at right angles to the assembly of the wire-shaped articles. This is so that the articles bear on the upper surface of the block.

Finally, the optical means permit the accurate controlling of the position of the wire-shaped articles.

BRIEF DESCRIPTION OF THE DRAWINGS

FIGS. 2a and 2b are side and top cross-sections, respectively, of the first embodiment of the device according to the invention.

DESCRIPTION OF THE PREFERRED EMBODIMENTS

Figure 1:
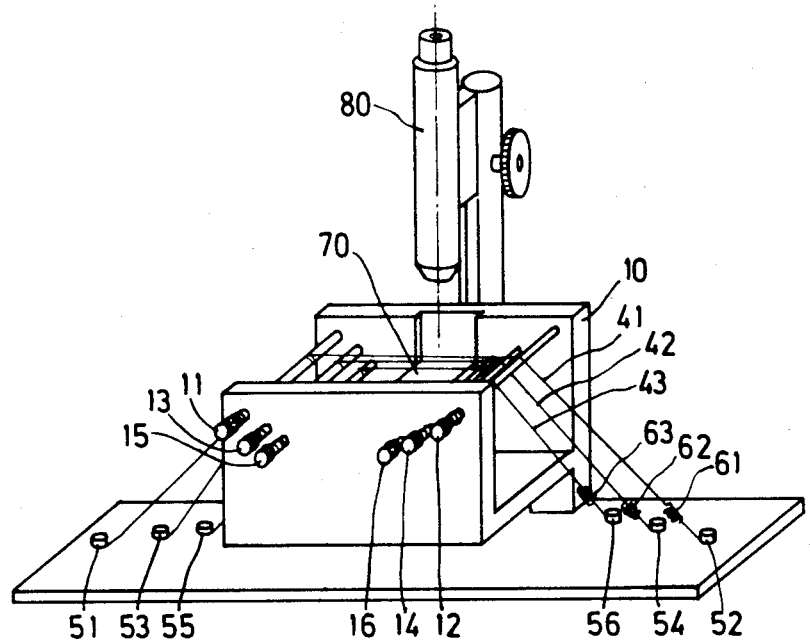
FIG. 1 is a perspective view of a first embodiment of the device according to the invention.

FIG. 1 is a perspective view of the device according to the invention. FIG. 2a is a section of the device taken on the vertical plane indicated by the line AA' in FIG. 2b which shows the plan view. The corresponding parts in FIGS. 1 and 2 are designated by the same reference symbols.

The means for positioning the wire-shaped articles are pins 11 to 16 which are passed through a support 10. These pins are parallel to each other and are grouped in pairs according to several horizontal levels slightly offset with respect to each other. The number of pairs of pins is equal to the number of articles that should be positioned.

By way of example, three articles (optical fibers) are shown in the views of FIGS. 1, 2a and 2b. It should be appreciated, however, that the device according to the invention can be used to position an arbitrary number of fibers.

Each of the pins 11 to 16 is threaded over a part of its length. Each pin traverses the support 10 through two holes. One hole is a non-threaded hole into which the non-threaded part of the pin penetrates. The other hole is a threaded hole into which the threaded part penetrates.

The diameters of the holes provided in the support 10 have very narrow tolerances. Moreover, the pins are provided with elastic means 21 to 26 (FIG. 2b) which eliminate the clearances of the threaded parts.

The pins 11 to 16 are provided on their non-threaded parts with grooves 31 to 36. (FIG. 2b.) The optical fibers 41 to 43 to be positioned are arranged so that each fiber bears in the grooves provided in two pins situated at the same level. Thus, each of the fibers can be displaced by rotation of the pins 11 to 16. This displacement can be very accurate. For example, if the pitch of each of the threaded parts supported by the pins is 0.5 mm, a rotation of a pin of 1/100 revolution, i.e. 3.6°, leads to a translation of the corresponding wire of 5 μm.

The fibers 14 to 43 are fixed by their ends to the base of the support 10 by fixing means 51 to 56 and are kept in tension by elastic means 61 to 63.

Between the pins of each pair of pins and below the optical fibers there is provided a movable block 70. Block 70 is adapted to slide vertically in a recess formed in a vertical part of the support 10. The position of block 10 is controlled by means of, for example, a screw 71 traversing the horizontal part of the support or by means of any other device ensuring a gradual vertical displacement of the block.

Elastic means 72 bear against another vertical part of the support 10 parallel to the preceding part. Elastic means 72 presses the block 70 against the support 10 so that it is prevented from moving horizontally.

Thus, when the block 70 is displaced upward, the optical fibers can come to bear on its upper surface. The fibers are kept in place on the upper surface of block 70 by the aforementioned elastic means 61 to 63.

Finally, a microscope 80 or other optical magnifying device is provided. The microscope 80 is movable according to three axes for observing the fibers 41 to 43 in the central region of their horizontal part. The microscope 80 is provided with a micrometric ocular for measuring the distances in the plane of observation.

Figure 3:
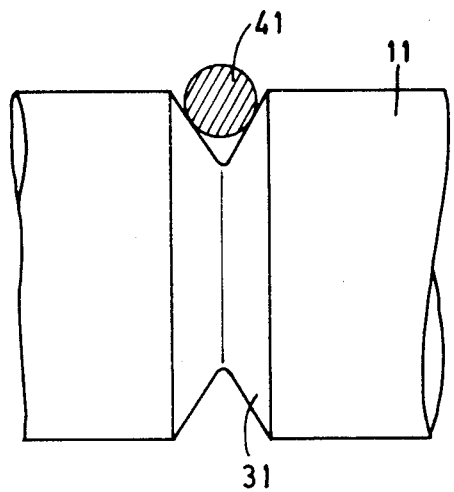
FIG. 3 is a partly elevational, partly cross-sectional view of a pin and fiber showing the form of the groove provided in the non-threaded part of the pins.

It should be noted that the dimensions of the grooves 31 to 36 are chosen so that the fibers 41 to 43 are accurately guided. That is, each fiber is tangent to the walls of the groove, as shown in FIG. 3.

Various methods of positioning fibers or wires by means of the device according to the invention will now be described. In a first embodiment, the elements 41 to 43 are lengths of the optical fiber whose positioning in the multiplex/demultiplexer should be ensured. These lengths of fibers are held in place in horizontal planes slightly offset in height with respect to each other. By rotation of the pins 11 and 12 about their axes, the fiber 41 can be displaced arbitrarily in a horizontal plane. Likewise by rotation of the pins 13 and 14 the fiber 42 is displaced, and so on.

By operating the screw 71, the movable block 70 is moved upward until it is very close to the fiber 43, but is not in contact with it. The fiber 43 can then be positioned accurately with respect to the ribs of the block 70 by actuating the pins 15 and 16, while observing the position of the fiber by means of the microscope 80.

Subsequently, the block 70 is moved upward until it is very close to the fiber 42, but is not in contact with it. The fibers 42 and 43 are then observed clearly simultaneously in the microscope 80. By rotating the pins 13 and 14, the fiber 42 is displaced until it becomes parallel to the fiber 43, and the distance between the fibers 42 and 43 is adjusted so that their relative distance is equal to the distance which has to exist between two optical fibers in the multiplexer/demultiplexer. The parallelism and the relative distance between the fibers 43 and 42 are checked with the aid of the microscope 80.

Subsequently, the screw 71 is turned so that the block 70 is moved upward until it is very close to the fiber 41, but without being in contact with it. During this process step, the block 70 is displaced vertically and consequently the parallelism and the relative distance between the fibers 42 and 43 are not modified.

By rotating the pins 11 and 12 about their axes, the parallelism and the relative distances between the fiber 41 and the fibers 42 and 43 are adjusted with the aid of the microscope 80.

The positions of the fibers have thus been adjusted successively with respect to each other. Throughout this process, the assembly of the fibers 41 to 43 is kept in tensioned by the action of the elastic means 61 to 63. As a result, the fibers on the movable block 70 at the end of the adjustment stage.

On the movable block 70, the fibres 41 to 43 are parallel to each other and are spaced in the manner required in the multiplexer/demultiplexer. The spacing is calculated beforehand as a function of the properties of the dispersive element, as a function of the focal distance of the decollimator lens and as a function of the different wavelengths used in multiplexing.

It should be noted that the fibers 41 to 43 need not be positioned parallel to each other. If desired, some of the fibers can be positioned so that they subtend an adjustable angle with the other fibers. However, it is generally desired that the fibers be arranged parallel to each other.

After having positioned the lengths of fibers 41 to 43 on the movable block 70, the microscope 80 is removed. Next, an adhesive 73 (FIG. 4) is applied to the upper surface of the block 70 in a sufficient quantity to cover all the lengths of fiber. Finally, another block 74 whose dimensions are approximately equal to those of the block 70 is arranged above the assembly.

After the adhesive 73 has dried, the fixing means 51 to 56 and the elastic means 61 to 63 are detached. The fibers 41 to 43 are then cut flush with one end of the block 70. After this operation, a rigid assembly is obtained consisting of the two blocks 70 and 74 and the fibers 41 to 43 fastened therebetween.

Figure 4:
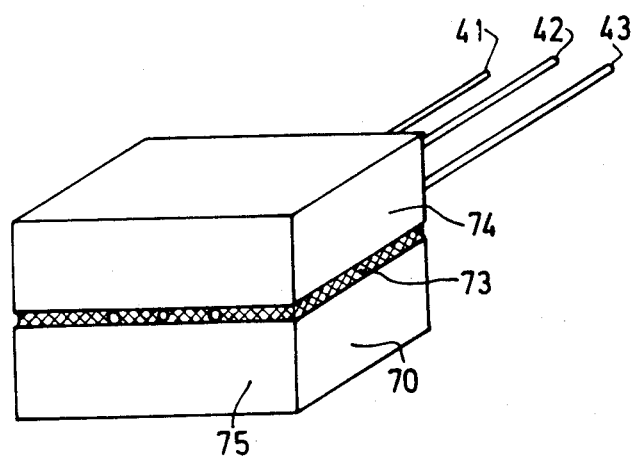
FIG. 4 is a perspective view of the rigid assembly in which the optical fibers are positioned according to the first embodiment.

After having polished the surface 75 common to the blocks 70 and 74 on the side where the fibers have been cut, the rigid assembly of FIG. 4 is obtained. In this assembly the fibers are arranged in positions identical to those assigned to them during the positioning step. Consequently, this assembly can be directly positioned in the focal plane of the decollimator lens with which the multiplexer/demultiplexer is provided.

In a second embodiment of the invention, the wire-shaped articles on the device are wires made of a material which is hard and resistant to scratching and whose outer diameter is approximately equal to the outer diameter of the optical fibers which have to be positioned in the multiplexer/demultiplexer.

Figure 5:
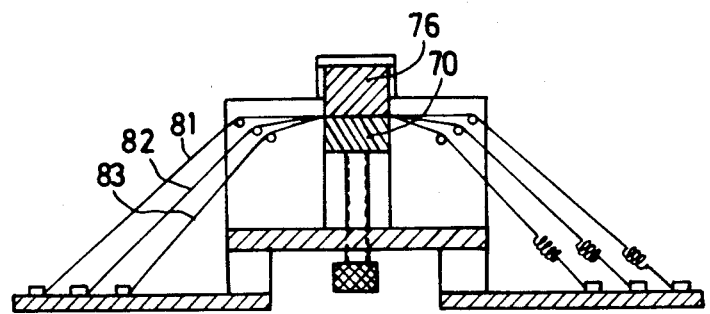
FIG. 5 is a cross-section of a second embodiment of a device according to the invention.

After having positioned the wires in the manner described above for the optical fibers, the assembly of the wires 81 to 83 bears on the movable block 70, as shown in FIG. 5.

The microscope 80 having been removed, another block 76 made of a plastic material is pressed on the top of the movable block 70. The pressure exerted must be sufficient to press the wires 81 to 83 into the block 76. After this operation, the block 76 has on one of its surfaces a series of grooves whose number is equal to the number of wires.

A modification of this second embodiment which can be realized in a simpler manner consists in that the wires 81 to 83 are made of a metallic hard material (e.g. steel, refractory metal), while the block 70 and the pins 11 to 16 are made of a material which is hard, electrically insulating and resistant to heat. In this case, the block 76 may advantageously be made of a thermoplastic material (for example, methyl polymethacrylate).

Figure 6:
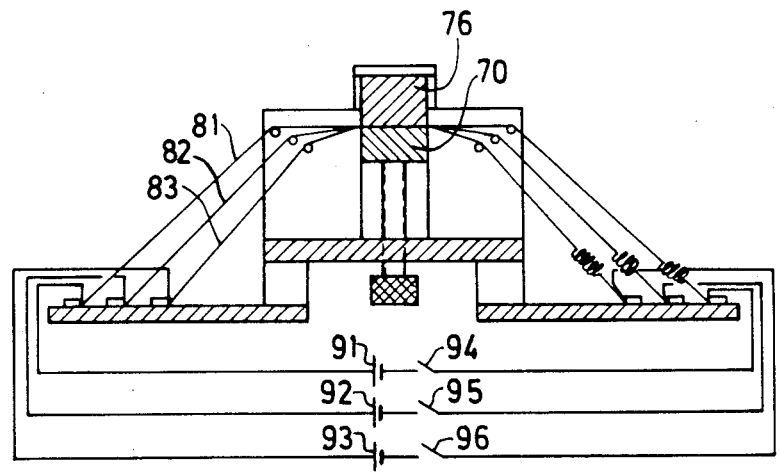
FIG. 6 is a cross-section of a modification of the second embodiment.

FIG. 6 shows an elevational view of this device in the state in which it is shown in FIG. 5 with the addition of electric current generators 91 to 93. Current generators 91 to 93 are coupled to switches 94 to 96, respectively, to feed the assembly of wires with current.

After wires 81 to 83 are positioned, the block 76 is then pressed against the top of the block 70, as shown in FIG. 6. When the switches 94 to 96 are closed, an electric current is passed through the wires 81 to 83. The current is of an intensity sufficient to ensure that the heating of the wires causes the block 76 to be softened around the wires. Afterward, block 76 has on one of its surfaces a series of grooves whose number is equal to the number of wires. The depth of these grooves can be adjusted by regulating the pressure exerted on the block 76 during the engraving operation, as well as by adjusting the intensity and the duration of the application of the current to the wires 81 to 83.

Figure 7:
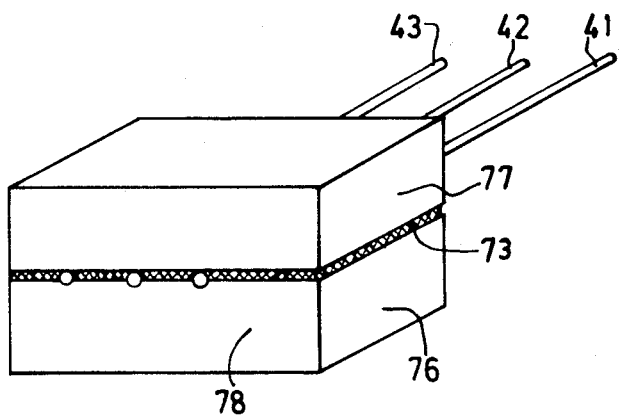
FIG. 7 is a perspective view of the rigid assembly in which the optical fibers are positioned according to the second embodiment.

After this pressing operation, the block 76 serves as a support for the optical fibers used in the multiplexer/demultiplexer. The fibers 41 to 43 are positioned in the grooves of the block 76. After the fibers are positioned, another block 77 of dimensions approximately equal to those of the block 76 is arranged above the assembly and fixed by means of an adhesive 73 or by any other fixing means. After the fibers are cut flush with one end of the block 76, and the surface 78 common to the blocks 76 and 77 is polished on the side where the fibers have been cut, the rigid assembly of FIG. 7 is obtained. In this assembly, the fibers are located at the positions of wires 81 to 83 during the positioning step. Subsequently, the rigid assembly can be directly positioned in the focal plane of the decollimator lens with which the multiplexer/demultiplexer is provided.

What is claimed is:

1. A device for positioning at least two wire-shaped articles with respect to each other, each wire-shaped article having two ends, said device comprising:
   a support having two sides and a number of holes in the sides, said holes being arranged in pairs opposite each other in the sides of the support, one hole in each pair being threaded;
   two groups of pins mounted on the support, each pin mounted in a pair of holes in the sides of the support so as to be parallel to each other, each group comprising a pair of pins located in a horizontal plane, the plane of one pair of pins being above the plane of the other pair of pins, each pin having a threaded portion and a nonthreaded portion, the threaded portion being arranged in a threaded hole in a side of the support, the nonthreaded portion having a groove therein;
   means for fixing the ends of each wire-shaped article on the support, said means comprising elastic means for fixing one end of each wire-shaped article so as to maintain the article in tension;
   means for translating a movable block between the pins of each pair of pins and perpendicular to the planes of each pair of pins; and
   optical means for measuring the positions of the wire-shaped articles;
   whereby in operation each wire-shaped article is arranged in tension in the grooves of a pair of pins so that rotation of the pins displaces the portion of the article between the pins, and the movable block is translated upward so that the portions of the articles between the pins bear on an upper surface of the block.

2. A method of positioning at least two optical fibers by using the device claimed in claim 1, said method comprising the steps of:
   fixing the fiber ends to the fixing means;
   arranging each fiber in the grooves in a pair of pins, a first fiber being arranged in the grooves of the lower pins, and a second fiber being arranged in the grooves of the upper pins;
   adjusting the position of the first fiber by rotating the lower pins while measuring the position thereof with the optical means;
   translating the movable block to contact the first fiber and to raise it to nearly the height of the second fiber, but without contacting the second fiber;
   adjusting the position of the second fiber by rotating the upper pins while measuring the position thereof with the optical means;
   translating the movable block to contact the second fiber;
   covering the fibers with a second block and joining the second block to the movable block to keep the fibers in place in a rigid assembly;
   cutting the fibers at one end of the rigid assembly; and
   polishing the cut fiber ends to be flush with the end of the rigid assembly.

3. A method as claimed in claim 2, characterized in that the movable block and the second block are joined by an adhesive.

4. A method as claimed in claim 2, characterized in that the movable block and the second block are joined by pressure.

5. A method of positioning at least two optical fibers by using the device claimed in claim 1 said method comprising the steps of:
   providing at least two hard wire-shaped articles, each article having two ends;
   fixing the ends of the wire-shaped articles to the fixing means;
   arranging each wire-shaped article in the grooves in a pair of pins, a first wire-shaped article being arranged in the grooves of the lower pins, and a second wire-shaped article being arranged in the grooves of the upper pins;
   adjusting the position of the first wire-shaped article by rotating the lower pins while measuring the position thereof with the optical means;
   translating the movable block to contact the first wire-shaped article and to raise it to nearly the height of the second wire-shaped article, but without contacting the second wire-shaped article;

adjusting the position of the second wire-shaped article by rotating the upper pins while measuring the position thereof with the optical means;

translating the movable block to contact the second wire-shaped article;

pressing a block of plastic material against the articles on the upper surface of the movable block to form a series of grooves in the plastic block;

arranging optical fibers in the grooves in the plastic block;

covering the optical fibers with a second block and joining the second block to the movable block to keep the fibers in place in a rigid assembly;

cutting the fibers at one end of the rigid assembly; and polishing the cut fiber ends to be flush with the end of the rigid assembly.

6. A method as claimed in claim 5, characterized in that:

the wire-shaped articles are hard metallic wires;

the plastic block is made of a thermoplastic material; and the method further comprises the step of passing an electric current through the wires to heat the wires and to soften the thermoplastic material around the wires.

7. A method as claimed in claim 6, characterized in that the movable block and the second block are joined by an adhesive.

8. A method as claimed in claim 6, characterized in that the movable block and the second block are joined by pressure.

9. A method as claimed in claim 5, characterized in that the movable block and the second block are joined by an adhesive.

10. A method as claimed in claim 5, characterized in that the movable block and the second block are joined by pressure.

* * * * *